(12) United States Patent
Nishizaki (10) Patent No.: US 11,240,877 B2
(45) Date of Patent: Feb. 1, 2022

(54) NON-TRANSITORY COMPUTER-READABLE STORAGE MEDIUM, TERMINAL MANAGEMENT APPARATUS, AND TERMINAL MANAGEMENT SYSTEM

(71) Applicant: BROTHER KOGYO KABUSHIKI KAISHA, Nagoya (JP)

(72) Inventor: Takashi Nishizaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/144,118

(22) Filed: Jan. 7, 2021

(65) Prior Publication Data

US 2021/0212164 A1 Jul. 8, 2021

(30) Foreign Application Priority Data

Jan. 8, 2020 (JP) .............................. JP2020-001473

(51) Int. Cl.
  *G06F 15/00* (2006.01)
  *G06F 3/12* (2006.01)
  *G06K 1/00* (2006.01)
  *H04W 88/04* (2009.01)
  *H04W 88/06* (2009.01)

(52) U.S. Cl.
  CPC .......... *H04W 88/04* (2013.01); *G06F 3/1203* (2013.01); *G06F 3/1232* (2013.01); *G06F 3/1236* (2013.01); *G06F 3/1287* (2013.01); *H04W 88/06* (2013.01)

(58) Field of Classification Search
  CPC ..... H04W 88/04; H04W 88/06; G06F 3/1203; G06F 3/1232; G06F 3/1236; G06F 3/1287

USPC ............................... 358/1.15, 1.14, 1.13, 1.1
See application file for complete search history.

(56) References Cited

U.S. PATENT DOCUMENTS

| | | | |
|---|---|---|---|
| 2012/0218599 A1* | 8/2012 | Kashioka | G06F 3/1272 358/1.15 |
| 2016/0227055 A1* | 8/2016 | Ishino | H04N 1/00511 |
| 2016/0366292 A1* | 12/2016 | Anezaki | H04W 8/005 |

(Continued)

FOREIGN PATENT DOCUMENTS

| | | |
|---|---|---|
| JP | 2017-536598 A | 12/2017 |
| JP | 2019-185524 A | 10/2019 |
| WO | 2016/048417 A1 | 3/2016 |

*Primary Examiner* — Douglas Q Tran
(74) *Attorney, Agent, or Firm* — Kenealy Vaidya LLP (57) ABSTRACT

A terminal management system includes a first system including a terminal management apparatus, a relay apparatus, and a first terminal apparatus, and a second system including the terminal management apparatus and a second terminal apparatus. In a case where the terminal management apparatus receives an instruction to a primary communication target apparatus, which enables to communicate with the terminal management apparatus, from an external apparatus, the terminal management apparatus determines whether the received instruction is a determination target instruction, transfers the received instruction to the primary communication target apparatus in a case where it is determined that the received instruction is the determination target instruction, and transfers the received instruction to the relay apparatus in a case where it is determined that the received instruction is not the determination target instruction.

6 Claims, 7 Drawing Sheets

(56) References Cited

U.S. PATENT DOCUMENTS

2019/0319922 A1 10/2019 Nishizaki
2020/0280646 A1* 9/2020 Onishi .................. G06F 3/1238

* cited by examiner

| CLIENT ID | ACTION CHECK INTERVAL | LAST ACTION CHECK TIME | VERSION | CLIENT TYPE | *** |
|---|---|---|---|---|---|
| AAA | ONE MINUTE | 2019/8/21/17:00:00 | 1.12 | SERVICE | *** |
| BBB | ONE MINUTE | 2019/8/21/17:00:10 | 1.11 | PRINTER | *** |

FIG. 3B

| ACTION ID | ACTION TYPE | PERIODIC FLAG | ACTION CONTENT |
|---|---|---|---|
| ACTION A | CHECK STATUS | true | Interval=30min. |
| ACTION B | TEST PRINT | false | – |
| ACTION C | UPDATE CHECK ACTION TIME | false | Interval=45sec. |
| ACTION D | FILE INSTALL | false | File URL=***** |

FIG. 3C

| DEVICE ID | CLIENT ID | MODEL NAME | SERIAL NUMBER | FIRM VERSION | PARAMETER | *** |
|---|---|---|---|---|---|---|
| 111 | AAA | AA-AAAAAA | A1A111111 | 1.12 | Print Speed=***, ..., ..., | |
| 222 | AAA | BB-BBBBBB | B2B222222 | 1.00 | Print Speed=***, ..., ..., | |
| 333 | BBB | CC-CCCCCC | C3C333333 | 1.11 | Print Speed=***, ..., ..., | |

FIG. 3D

| CLIENT ID | ACTION ID |
|---|---|
| AAA | ACTION A |
| AAA | ACTION C |
| BBB | ACTION C |

FIG. 3E

| DEVICE ID | ACTION ID |
|---|---|
| 111 | ACTION B |
| 222 | ACTION D |

NON-TRANSITORY COMPUTER-READABLE STORAGE MEDIUM, TERMINAL MANAGEMENT APPARATUS, AND TERMINAL MANAGEMENT SYSTEM

CROSS-REFERENCE TO RELATED APPLICATION

This application is based upon and claims the benefit of priority from prior Japanese patent application No. 2020-001473, filed on Jan. 8, 2020, the entire contents of which are incorporated herein by reference.

TECHNICAL FIELD

The present disclosure relates to a non-transitory computer-readable storage medium storing a computer program executed by computer mounted on a terminal management apparatus in a terminal management system, the terminal management apparatus, and the terminal management system.

BACKGROUND

A technology of managing a printer having no function of directly connecting to the Internet by a management server connected to the Internet is suggested (for example, refer to JP-A-2019-185524).

JP-A-2019-185524 does not disclose technology for a printer having a function of directly connecting to the Internet. In particular, JP-A-2019-185524 does not disclose technology of appropriately managing the printer having no function of directly connecting to the Internet and the printer having a function of directly connecting to the Internet, in a state where those printers coexist.

SUMMARY

The specification discloses a non-transitory computer-readable storage medium storing a computer program, a terminal management apparatus, and a terminal management system, which enable to appropriately manage terminal apparatuses having different communication functions.

A first aspect of the present disclosure is a non-transitory computer-readable storage medium storing a computer program, when executed by a computer mounted on a terminal management apparatus in a terminal management system where a first system and a second system coexist, the first system including the terminal management apparatus, a relay apparatus and a first terminal apparatus, in which the terminal management apparatus is configured to enable to communicate with the relay apparatus, the relay apparatus is configured to enable to communicate with the first terminal apparatus, and in a case of transferring information between the terminal management apparatus and the first terminal apparatus, the information is transferred via the relay apparatus, and the second system including the terminal management apparatus and a second terminal apparatus, in which the terminal management apparatus is configured to enable to communicate with the second terminal apparatus, and in a case of transferring information between the terminal management apparatus and the second terminal apparatus, the information is transferred without passing through the relay apparatus, the computer program being configured to cause the terminal management apparatus to:

in a case where the terminal management apparatus receives an instruction to a primary communication target apparatus, which is configured to enable to communicate with the terminal management apparatus, from an external apparatus, determine whether the received instruction is a determination target instruction;

transfer the received instruction to the primary communication target apparatus in a case where it is determined that the received instruction is the determination target instruction; and transfer the received instruction to the relay apparatus in a case where it is determined that the received instruction is not the determination target instruction.

A second aspect of the present disclosure is a terminal management apparatus in a terminal management system where a first system and a second system coexist, the first system including the terminal management apparatus, a relay apparatus, and a first terminal apparatus, in which the terminal management apparatus is configured to enable to communicate with the relay apparatus, the relay apparatus is configured to enable to communicate with the first terminal apparatus, and in a case of transferring information between the terminal management apparatus and the first terminal apparatus, the information is transferred via the relay apparatus, and the second system including the terminal management apparatus and a second terminal apparatus, in which the terminal management apparatus is configured to enable to communicate with the second terminal apparatus, and in a case of transferring information between the terminal management apparatus and the second terminal apparatus, the information is transferred without passing through the relay apparatus, the terminal management apparatus is configured to:

in a case where the terminal management apparatus receives an instruction to a primary communication target apparatus, which is configured to enable to communicate with the terminal management apparatus, from an external apparatus, determine whether the received instruction is a determination target instruction;

transfer the received instruction to the primary communication target apparatus in a case where it is determined that the received instruction is the determination target instruction; and transfer the received instruction to the relay apparatus in a case where it is determined that the received instruction is not the determination target instruction.

A third aspect of the present disclosure is a terminal management system where a first system and a second system coexist, the first system including a terminal management apparatus, a relay apparatus, and a first terminal apparatus, in which the terminal management apparatus is configured to enable to communicate with the relay apparatus, the relay apparatus is configured to enable to communicate with the first terminal apparatus, and in a case of transferring information between the terminal management apparatus and the first terminal apparatus, the information is transferred via the relay apparatus, and the second system including the terminal management apparatus and a second terminal apparatus, in which the terminal management apparatus is configured to enable to communicate with the second terminal apparatus, and in a case of transferring information between the terminal management apparatus and the second terminal apparatus, the information is transferred without passing through the relay apparatus, the terminal management apparatus is configured to:
in a case where the terminal management apparatus receives an instruction to a primary communication target apparatus, which is configured to enable to communicate with the terminal management apparatus, from an external apparatus, determine whether the received instruction is a determination target instruction;

transfer the received instruction to the primary communication target apparatus in a case where it is determined that the received instruction is the determination target instruction; and transfer the received instruction to the relay apparatus in a case where it is determined that the received instruction is not the determination target instruction.

According to the non-transitory computer-readable storage medium storing the computer program, the terminal management apparatus, and the terminal management system of the present disclosure, the terminal management apparatus transfers the received instruction to the primary communication target apparatus in the case where the instruction received from the external apparatus is the determination target instruction. On the other hand, the terminal management apparatus transfers the received instruction to the relay apparatus in the case where the instruction received from the external apparatus is not the determination target instruction.

The determination target instruction is an instruction that is to be transferred to both the relay apparatus and the second terminal apparatus. An instruction that is to be transferred to the relay apparatus and is not required to be transferred to the second terminal apparatus is not the determination target instruction. Therefore, even though an instruction to the primary communication target apparatus is received from the external apparatus, the received instruction is transferred to the relay apparatus but is not transferred to the second terminal apparatus in the case where the instruction is not the determination target instruction.

According to this configuration, unlike a system where when an instruction to the primary communication target apparatus is received from the external apparatus, the instruction is uniformly transferred to the primary communication target apparatus, some instructions are not transferred to the second terminal apparatus. Therefore, it is not necessary for the second terminal apparatus to treat such some instructions, so that it is possible to accordingly reduce a load on the second terminal apparatus. In addition, for example, in a case where the second terminal apparatus is a battery drive-type mobile terminal apparatus, it is not necessary for the second terminal apparatus to treat some instructions, so that it is possible to accordingly suppress power consumption of the battery.

DETAILED DESCRIPTION

In the below, the terminal management processing program, the terminal management apparatus and the terminal management system are described with reference to exemplary embodiment.

(1) Configuration of Terminal Management System 1

Figure 1:
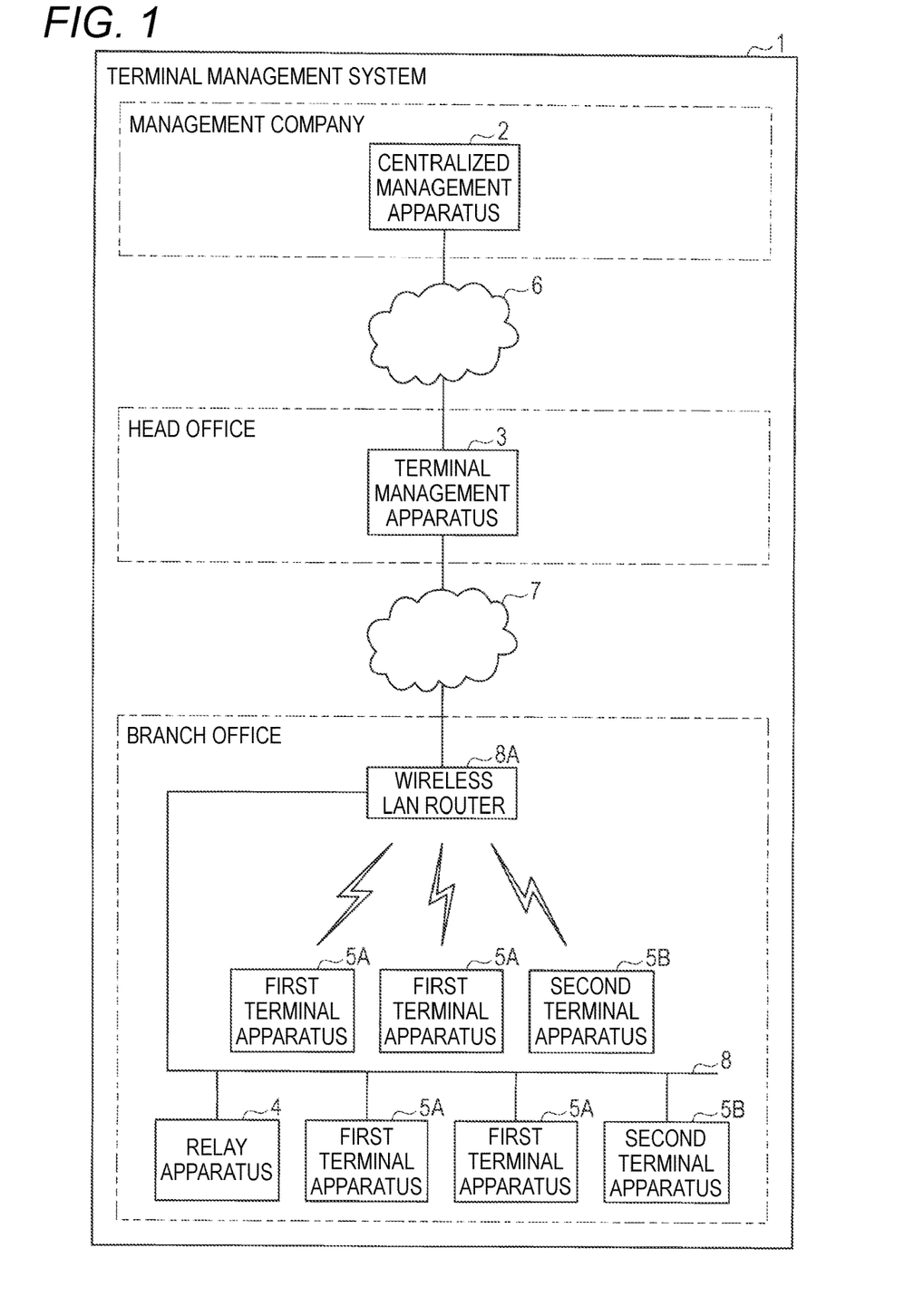
FIG. 1 is a block diagram depicting a configuration of a terminal management system.

As shown in FIG. 1, a terminal management system 1 includes a centralized management apparatus 2, a terminal management apparatus 3, a relay apparatus 4, a first terminal apparatus 5A, and the second terminal apparatus 5B. In descriptions below, when it is not necessary to explicitly distinguish between the first terminal apparatus 5A and the second terminal apparatus 5B, the first terminal apparatus 5A and the second terminal apparatus 5B are also each referred to as a terminal apparatus 5. As shown in FIG. 1, the centralized management apparatus 2 and the terminal management apparatus 3 are configured to enable to communicate with each other via a WAN 6. The terminal management apparatus 3 and the relay apparatus 4 are configured to enable to communicate with each other via a WAN 7 and a LAN 8. The relay apparatus 4 and the first terminal apparatus 5A are configured to enable to communicate with each other via the LAN 8. The terminal management apparatus 3 and the second terminal apparatus 5B are configured to enable to communicate with each other via the WAN 7 and the LAN 8. The WAN is an abbreviation of Wide Area Network. The LAN is an abbreviation of Local Area Network. The WAN 6 and the WAN 7 may be the same networks or may be separate networks. In the present embodiment, the Internet is used for both the WAN 6 and the WAN 7.

The WAN 7 and the LAN 8 are connected to each other via a wireless LAN router 8A. The wireless LAN router 8A is a device having both a router function and a wireless LAN access point function. The wireless LAN router 8A has a firewall function, and is configured to prevent unauthorized access from the WAN 7-side to the LAN 8-side. The wireless LAN router 8A is connected to a LAN cable. The LAN 8 is configured by a combination of a wired LAN and a wireless LAN.

The terminal apparatus 5 may include a terminal apparatus 5 that can connect to the wireless LAN and a terminal apparatus 5 that can connect to the wired LAN. Examples of the terminal apparatus 5 that can connect to the wireless LAN include a printer (hereinbelow, also referred to as a mobile printer) that is used in conjunction with a mobile terminal. The terminal apparatus 5 that can connect to the wireless LAN establishes a communication link with the wireless LAN router 8A when it exists in a communication area with the wireless LAN router 8A, and is incorporated in the terminal management system 1. Examples of the terminal apparatus 5 that can connect to the wired LAN include a wireless LAN incompatible type printer or MFP (Multi-Function Peripheral).

In the terminal management system 1 of the present embodiment, for example, it is possible to collect information from the terminal apparatus 5 in the centralized management apparatus 2, and to implement test printing in the terminal apparatus 5, restart of the terminal apparatus 5 and shutdown of the terminal apparatus 5 by a remote operation on the centralized management apparatus 2. In the present embodiment, the terminal management apparatus 3 is configured to function as a server apparatus in a client/server system. The centralized management apparatus 2, the relay apparatus 4 and the second terminal apparatus 5B are each configured to function as a client apparatus in the client/server system. When transferring information between each of the centralized management apparatus 2, the relay apparatus 4 and the second terminal apparatus 5B and the terminal management apparatus 3, information is transmitted from the client apparatus to the server apparatus, and information as a response thereto is transmitted from the server apparatus to the client apparatus. Note that, the first terminal apparatus 5A has no function of communicating with other apparatuses via the WAN 7. For this reason, the information is transferred between the terminal management apparatus 3 and the first terminal apparatus 5A via the relay apparatus 4.

As an example of a place in which each of the apparatuses configuring the terminal management system 1 is equipped, a case where the terminal management apparatus 3 is equipped at a head office of a company A and the relay apparatus 4 and the terminal apparatus 5 are equipped at a branch office of the company A may be considered. In this case, information (hereinbelow, also referred to as terminal information) about a plurality of terminal apparatuses 5 that is managed at the branch office of the company A is collected by the terminal management apparatus 3 equipped at the head office of the company A. The terminal information collected by the terminal management apparatus 3 is collected and managed by the centralized management apparatus 2 that is operated by a management company different from the company A, for example. However, the centralized management apparatus 2 may also be operated by the company A, and it is optional whether the company A and the management company are separate companies.

Although not shown in FIG. 1, there may also be a plurality of terminal management apparatuses 3. In this case, the plurality of terminal management apparatuses 3 may be managed by one centralized management apparatus 2. For example, the terminal management apparatus 3 may be further equipped at each of companies B, C, D, . . . different from the company A, and the plurality of terminal management apparatuses 3 may be managed by one centralized management apparatus 2 equipped at the management company.

Although not shown in FIG. 1, there may also be a plurality of relay apparatuses 4. In this case, the plurality of relay apparatuses 4 may be managed by one terminal management apparatus 3. For example, in a case where the company A has a plurality of branch offices, the relay apparatuses 4 may be each equipped at the branch offices, and the plurality of relay apparatuses 4 may be managed by one terminal management apparatus 3 equipped at the head office.

Figure 2A:
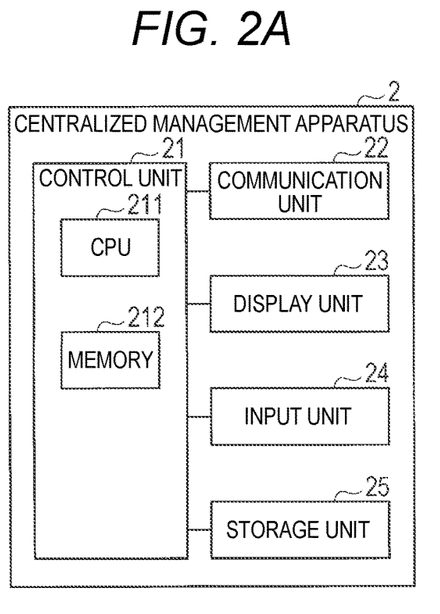
FIG. 2A is a block diagram depicting a configuration of a centralized management apparatus.

As shown in FIG. 2A, the centralized management apparatus 2 includes a control unit 21, a communication unit 22, a display unit 23, an input unit 24 and a storage unit 25. The control unit 21 includes a CPU 211 and a memory 212. The CPU 211 is configured to execute processing and control according to software stored in the memory 212, thereby implementing a variety of functions of the centralized management apparatus 2. However, the present disclosure is not limited to the configuration where the diverse functions of the centralized management apparatus 2 are implemented by the CPU 211 and the software. For example, some or all of the functions may also be implemented by one or more hardware.

The memory 212 includes a semiconductor memory (for example, a ROM, a RAM, an NVRAM and a flash memory) that is a non-transitory tangible recording medium. The memory 212 stores software and data. The communication unit 22 includes a network interface controller that can connect to the WAN 6 and perform communication via the WAN 6. The display unit 23 includes a display device (for example, a liquid crystal monitor or an organic EL display), and is configured to display diverse images. The input unit 24 includes an input device for receiving a variety of input operations and an input controller for processing an input from the input device. The storage unit 25 is configured by an auxiliary storage device such as an HDD (Hard Disk Drive) and an SSD (Solid State Drive), for example.

Figure 2B:
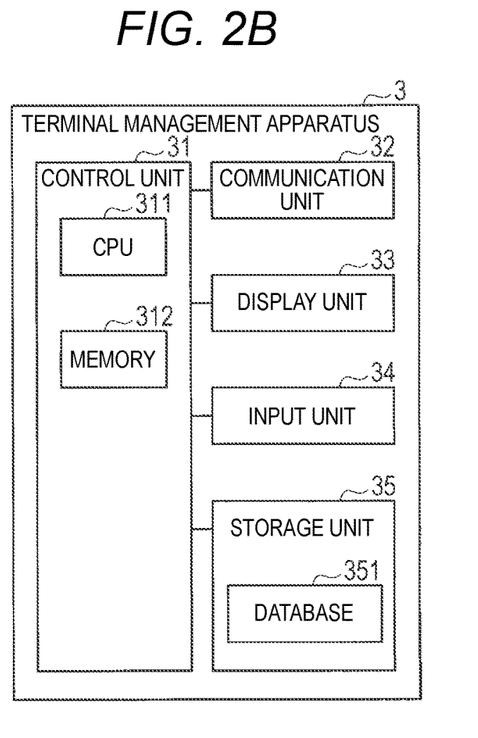
FIG. 2B is a block diagram depicting a configuration of a terminal management apparatus.

As shown in FIG. 2B, the terminal management apparatus 3 includes a control unit 31, a communication unit 32, a display unit 33, an input unit 34 and a storage unit 35. The control unit 31 includes a CPU 311 and a memory 312. The CPU 311 is configured to execute processing and control according to software stored in the memory 312, thereby implementing a variety of functions of the terminal management apparatus 3. However, the present disclosure is not limited to the configuration where the diverse functions of the terminal management apparatus 3 are implemented by the CPU 311 and the software. For example, some or all of the functions may also be implemented by one or more hardware.

The memory 312 includes a semiconductor memory (for example, a ROM, a RAM, an NVRAM and a flash memory) that is a non-transitory tangible recording medium. The memory 312 stores software and data. The communication unit 32 includes a network interface controller that can connect to the WAN 6 and perform communication via the WAN 6. Note that, in the present embodiment, since the WAN 6 and the WAN 7 are the same networks, the communication unit 32 can also connect to the WAN 7 and perform communication via the WAN 7. The display unit 33 includes a display device (for example, a liquid crystal monitor or an organic EL display), and is configured to display diverse images. The input unit 34 includes an input device for receiving a variety of input operations and an input controller for processing an input from the input device. The storage unit 35 is configured by an auxiliary storage device such as an HDD and an SSD, for example. In the storage unit 35, a database 351 is configured (hereinbelow, the database 351 is abbreviated as the DB 351).

Figure 3A:
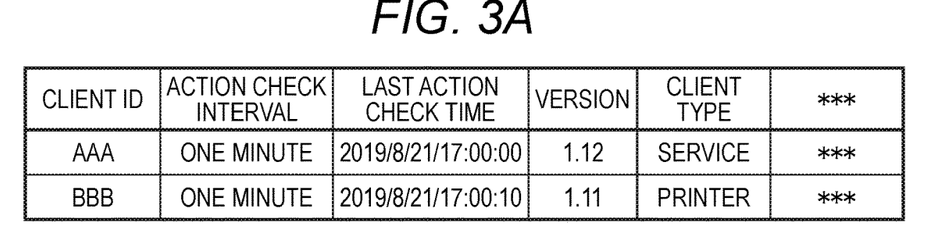
FIG. 3A depicts an example of a client table.

When the terminal management apparatus 3 executes processing that will be described later, a variety of data is registered on the DB 351 and update and deletion of the data are executed. In the DB 351, a client table as shown in FIG.

Figure 3B:
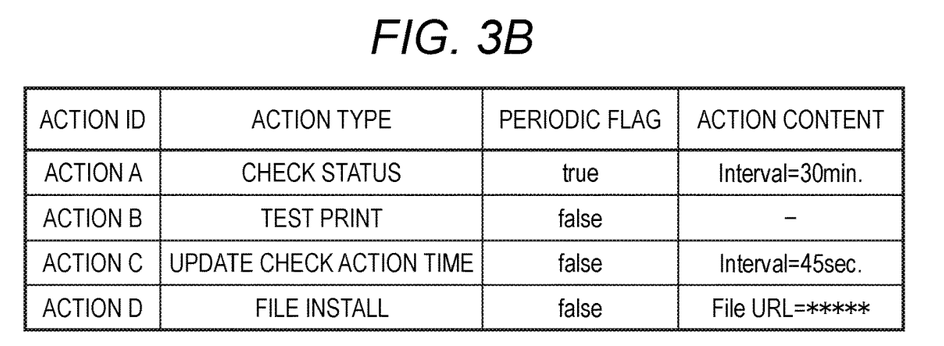
FIG. 3B depicts an example of an action table.
Figure 3C:
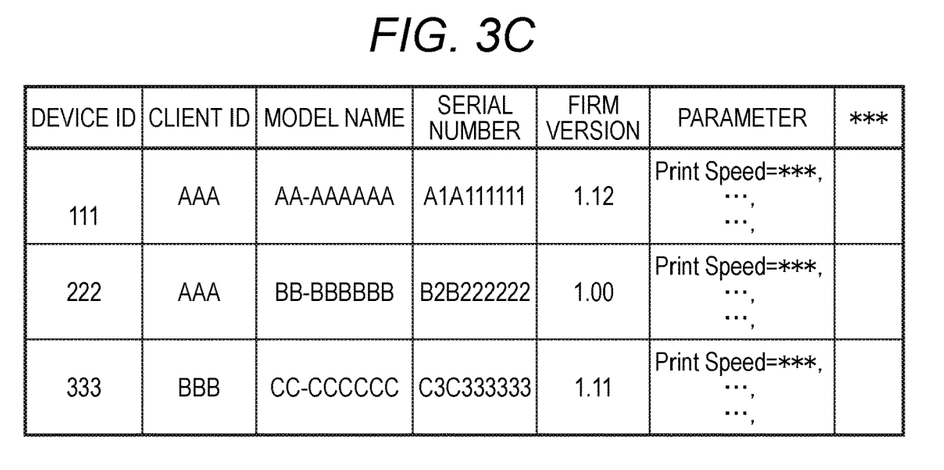
FIG. 3C depicts an example of a device table.
Figure 3D:
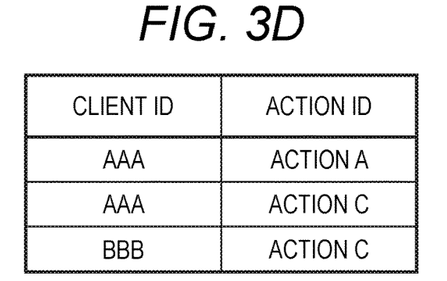
FIG. 3D depicts an example of a client-action intermediate table.
Figure 3E:
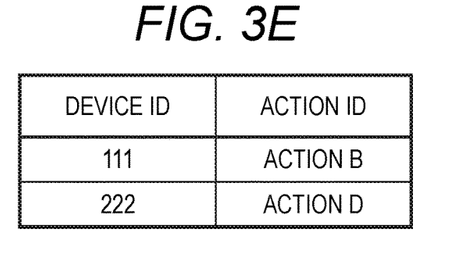
FIG. 3E depicts an example of a device-action intermediate table.

3A, an action table as shown in FIG. 3B, a device table as shown in FIG. 3C, a client-action intermediate table as shown in FIG. 3D and a device-action intermediate table as shown in FIG. 3E are secured. The tables will be described in detail later.

Figure 2C:
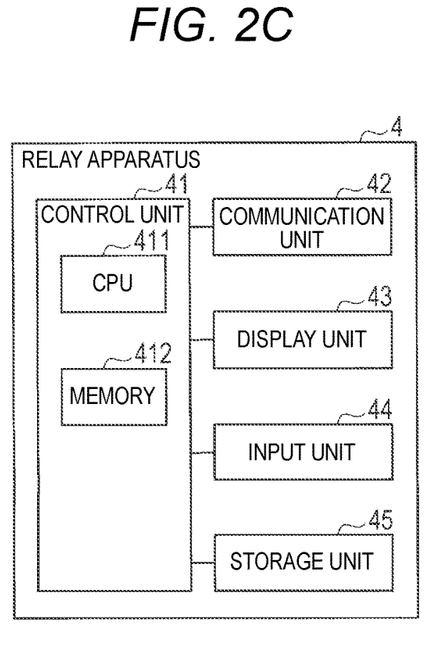
FIG. 2C is a block diagram depicting a configuration of a relay apparatus.

As shown in FIG. 2C, the relay apparatus 4 includes a control unit 41, a communication unit 42, a display unit 43, an input unit 44 and a storage unit 45. The control unit 41 includes a CPU 411 and a memory 412. The CPU 411 is configured to execute processing and control according to software stored in the memory 412, thereby implementing a variety of functions of the relay apparatus 4. However, the present disclosure is not limited to the configuration where the diverse functions of the relay apparatus 4 are implemented by the CPU 411 and the software. For example, some or all of the functions may also be implemented by one or more hardware.

The memory 412 includes a semiconductor memory (for example, a ROM, a RAM, an NVRAM and a flash memory) that is a non-transitory tangible recording medium. The memory 412 stores software and data. The communication unit 42 includes a network interface controller that can connect to the WAN 7 and perform communication via the WAN 7, and a network interface controller that can connect to the LAN 8 and perform communication via the LAN 8. The display unit 43 includes a display device (for example, a liquid crystal monitor or an organic EL display), and is configured to display diverse images. The input unit 44 includes an input device for receiving a variety of input operations and an input controller for processing an input from the input device. The storage unit 35 is configured by an auxiliary storage device such as an HDD and an SSD, for example.

Figure 2D:
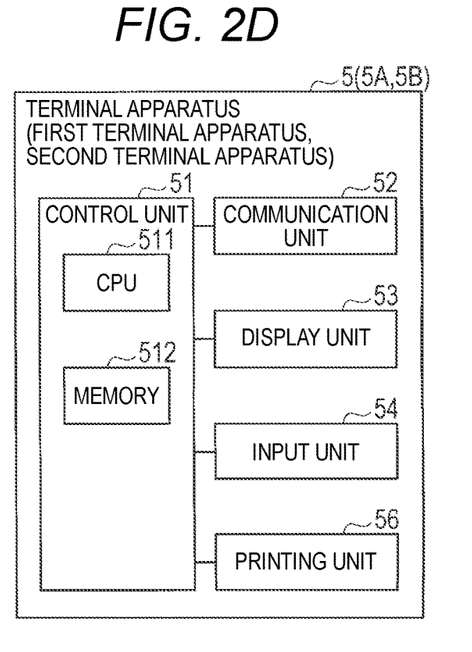
FIG. 2D is a block diagram depicting a configuration of a terminal apparatus.

As shown in FIG. 2D, the terminal apparatus 5 includes a control unit 51, a communication unit 52, a display unit 53, an input unit 54 and a printing unit 56. The first terminal apparatus 5A and the second terminal apparatus 5B are different in terms of performance of hardware, and firmware and software installed in each of the apparatuses. However, the differences are not shown in FIG. 2D. The control unit 51 includes a CPU 511 and a memory 512. The CPU 511 is configured to execute processing and control according to software stored in the memory 512, thereby implementing a variety of functions of the terminal apparatus 5. However, the present disclosure is not limited to the configuration where the diverse functions of the terminal apparatus 5 are implemented by the CPU 511 and the software. For example, some or all of the functions may also be implemented by one or more hardware.

The memory 512 includes a semiconductor memory (for example, a ROM, a RAM, an NVRAM and a flash memory) that is a non-transitory tangible recording medium. The memory 512 stores software and data. The communication unit 52 includes a network interface controller that can connect to the LAN 8 and perform communication via the LAN 8. For example, in a case where the terminal apparatus 5 is a wireless LAN compatible type mobile printer, a network interface controller corresponding to wireless LAN standards is provided as the communication unit 52. In a case where the terminal apparatus 5 is a wired LAN compatible type printer, a network interface controller corresponding to wired LAN standards is provided as the communication unit 52.

The display unit 53 includes a display device (for example, a liquid crystal monitor or an organic EL display), and is configured to display diverse images. The input unit 54 includes an input device for receiving a variety of input operations and an input controller for processing an input from the input device. The printing unit 56 has a thermal printing mechanism and is configured to perform printing on a thermal roll sheet. However, the printing unit 56 may also be configured to perform printing on a cut sheet. Alternatively, the printing unit 56 may also be configured to print an image by a well-known (for example, an inkjet method or an electrophotographic method) other than thermal method.

(2) Outline of Operations of Terminal Management System 1

In the present embodiment, the terminal management system 1 operates as follows. When a relay processing program is installed in a computer and is then activated, the computer starts processing as the relay apparatus 4. When the relay processing program is activated, the relay apparatus 4 accesses the terminal management apparatus 3 via the WAN 7 and transmits a registration request of the relay apparatus 4 to the terminal management apparatus 3. Also, when the second terminal apparatus 5B is activated, the second terminal apparatus 5B accesses the terminal management apparatus 3 via the WAN 7 and transmits a registration request of the second terminal apparatus 5B to the terminal management apparatus 3.

When the registration request from the relay apparatus 4 or the second terminal apparatus 5B is received, the terminal management apparatus 3 executes client registration processing. Although the client registration processing will be described in detail later, an outline of the client registration processing is herein briefly described. In the client registration processing, the terminal management apparatus 3 determines whether a transmission source of the registration request (i.e., the relay apparatus 4 or the second terminal apparatus 5B) is already registered on the DB 351. When the transmission source is not registered on the terminal management apparatus 3, the information of the transmission source is registered on the DB 351.

Subsequently, the terminal management apparatus 3 registers action information, which indicates that periodic processing is to be executed as an action that should be executed by each of the relay apparatus 4 and the second terminal apparatus 5B, on the DB 351. The action information is registered on the DB 351, as periodic information. The periodic information is information that is kept registered on the DB 351 without being deleted as long as deletion thereof is not instructed by a command transmitted from the centralized management apparatus 2 to the terminal management apparatus 3 or a command input by a user operation on the terminal management apparatus 3. When each of the relay apparatus 4 and the second terminal apparatus 5B starts to operate, each of the relay apparatus 4 and the second terminal apparatus 5B executes the periodic processing, and periodically inquires of the terminal management apparatus 3 whether there is an action that should be treated in each of the relay apparatus 4 and the second terminal apparatus 5B.

In response to the inquiry, if action information about actions that should be executed by each of the relay apparatus 4 and the second terminal apparatus 5B is registered on the DB 351, the terminal management apparatus 3 returns the action information to each of the relay apparatus 4 and the second terminal apparatus 5B. At the time of first inquiry from each of the relay apparatus 4 and the second terminal apparatus 5B, the action information indicating that the periodic processing is to be executed is returned to the relay apparatus 4 and the second terminal apparatus 5B. The relay apparatus 4 and the second terminal apparatus 5B acquire the action information indicating that the periodic processing is to be executed, and thereafter repeatedly execute the periodic processing whenever an interval elapses, according to an interval setting included in the action information.

The relay apparatus 4 searches for the first terminal apparatus 5A, which is to be a management target by SNMP (Simple Network Management Protocol), on the LAN 8. When the first terminal apparatus 5A that is to be a management target is found, the relay apparatus 4 transmits a registration request of terminal information about the first terminal apparatus 5A to the terminal management apparatus 3. The terminal management apparatus 3 that receives the registration request of the terminal information registers the terminal information on the DB 351.

When a command is input to the relay apparatus 4, the first terminal apparatus 5A or the second terminal apparatus 5B by a user operation on the centralized management apparatus 2, the command is transmitted from the centralized management apparatus 2 to the terminal management apparatus 3. The command may also be input to the relay apparatus 4, the first terminal apparatus 5A or the second terminal apparatus 5B by a user operation on the terminal management apparatus 3. When the command transmitted from the centralized management apparatus 2 or the command input from the terminal management apparatus 3 is received, the terminal management apparatus 3 executes instruction storing processing. Although the instruction storing processing will be described in detail later, an outline of the instruction storing processing is herein briefly described.

In the instruction storing processing, action information corresponding to the command transmitted from the centralized management apparatus 2 or the command input from the terminal management apparatus 3 is registered on the DB 351. This action information includes action information that is registered as the periodic information as described above, and action information that is registered as one-off information. The one-off information is information that, when processing corresponding to the one-off information is executed in the first terminal apparatus 5A or the second terminal apparatus 5B, is thereafter deleted from the DB 351.

For example, when the command transmitted from the centralized management apparatus 2 to the terminal management apparatus 3 or the command input by the user operation on the terminal management apparatus 3 is a test printing or restart command for the first terminal apparatus 5A or the second terminal apparatus 5B, the terminal management apparatus 3 registers action information corresponding the command for the first terminal apparatus 5A or the second terminal apparatus 5B on the DB 351. This action information is registered on the DB 351, as one-off information.

As described above, the relay apparatus 4 and the second terminal apparatus 5B periodically inquire of the terminal management apparatus 3 whether there is an action that should be treated in the relay apparatus 4. In response to the inquiry, if the one-off information is registered on the DB 351, the terminal management apparatus 3 returns the action information (i.e., the one-off information) to the relay apparatus 4 or the second terminal apparatus 5B. In a case of the relay apparatus 4, the relay apparatus 4 transfers the command to the first terminal apparatus 5A, based on the returned action information. Thereby, test printing or restart is executed in the first terminal apparatus 5A. In a case of the second terminal apparatus 5B, the second terminal apparatus 5B executes test printing or restart, based on the returned action information.

When the processing is executed in the first terminal apparatus 5A, the relay apparatus 4 transmits a result of the execution and an action deletion request intended to complete an action in the first terminal apparatus 5A to the terminal management apparatus 3. When the processing is executed in the second terminal apparatus 5B, the second terminal apparatus 5B transmits a result of the execution and an action deletion request intended to complete an action in the second terminal apparatus 5B to the terminal management apparatus 3. The terminal management apparatus 3 deletes the information corresponding to the deletion requests from the DB 351.

When the user wants to change the interval of the periodic processing that is periodically executed in the relay apparatus 4 and the second terminal apparatus 5B, the user can also register action information for instructing a change in interval of the periodic processing on the DB 351 by the command transmitted from the centralized management apparatus 2 to the terminal management apparatus 3 or the command input by the user operation on the terminal management apparatus 3. This action information is registered on the DB 351, as one-off information.

As described above, the relay apparatus 4 and the second terminal apparatus 5B periodically inquire of the terminal management apparatus 3 whether there is an action that should be treated in the relay apparatus 4. In response to the inquiry, if the one-off information is registered on the DB 351, the terminal management apparatus 3 returns the action information (i.e., the one-off information) to each of the relay apparatus 4 and the second terminal apparatus 5B. The relay apparatus 4 and the second terminal apparatus 5B change the interval of the periodic processing that is executed by each of the relay apparatus 4 and the second terminal apparatus 5B, based on the returned action information. When the interval change is executed, the relay apparatus 4 and the second terminal apparatus 5B transmit a result of the execution and an action deletion request intended to complete an action in each of the relay apparatus 4 and the second terminal apparatus 5B to the terminal management apparatus 3. The terminal management apparatus 3 deletes the information corresponding to the deletion requests from the DB 351. Each of the relay apparatus 4 and the second terminal apparatus 5B that receive an interval change instruction resumes the periodic processing at the instructed interval.

The tables shown in FIGS. 3A to 3E are used by the terminal management apparatus 3 when executing the above-described processing. The client table (refer to FIG. 3A) is a table in which information about the relay apparatus 4 and the second terminal apparatus 5B, which are client apparatuses, is registered. In the example of FIG. 3A, the relay apparatus 4 and the second terminal apparatus 5B are registered one by one in the client table, and "AAA" and "BBB" are allotted as client IDs for identifying each of the relay apparatus 4 and the second terminal apparatus 5B. An action check interval is an interval at the time each of the relay apparatus 4 and the second terminal apparatus 5B accesses the terminal management apparatus 3 so as for the relay apparatus 4 and the second terminal apparatus 5B to receive the action information from the terminal management apparatus 3. In the example of FIG. 3A, each of the relay apparatus 4 and the second terminal apparatus 5B accesses the terminal management apparatus 3 at one-minute intervals. A client type is information indicating whether an apparatus corresponding to a client ID is the relay apparatus 4 or the second terminal apparatus 5B. In a case where an apparatus corresponding to a client ID is the relay apparatus 4, the client type is a service. In a case where an apparatus corresponding to a client ID is the second terminal apparatus 5B, the client type is a printer.

The action table (refer to FIG. 3B) is a table in which an action ID and an action type, which is a content of a specific action corresponding to the action ID, are associated with each other. A periodic flag is a flag indicating whether an action corresponding to an action ID is an action that is executed as periodic processing. An action whose periodic flag is true is an action that is executed as periodic processing. An action whose periodic flag is false is an action that is execute as one-off processing. An action content includes parameters that are necessary when executing actions.

The device table (refer to FIG. 3C) is a table in which terminal information about the first terminal apparatus 5A and the second terminal apparatus 5B is registered. In a case of the first terminal apparatus 5A, the terminal information is collected from the first terminal apparatus 5A and is uploaded to the terminal management apparatus 3 by the relay apparatus 4. In a case of the second terminal apparatus 5B, the terminal information is uploaded to the terminal management apparatus 3 by the second terminal apparatus 5B. A device ID is an ID allotted to each of the first terminal apparatus 5A and the second terminal apparatus 5B. A client ID is an ID allotted to each of the relay apparatus 4 and the second terminal apparatus 5B. A case where a client ID corresponding to a device ID is an ID corresponding to the relay apparatus 4 indicates that an apparatus associated with the device ID is the first terminal apparatus 5A. A case where a client ID corresponding to a device ID is an ID corresponding to the second terminal apparatus 5B indicates that an apparatus associated with the device ID is the second terminal apparatus 5B. A model name, a serial number, a firm version and a parameter are examples of the terminal information.

The client-action intermediate table (refer to FIG. 3D) is a table in which, when an action that should be executed in each of the relay apparatus 4 and the second terminal apparatus 5B is generated by a command transmitted from the centralized management apparatus 2 to the terminal management apparatus 3 or a command input by a user operation on the terminal management apparatus 3, for example, an action ID indicative of the action is registered in association with a client ID of each of the relay apparatus 4 and the second terminal apparatus 5B that should execute the action. When the terminal management apparatus 3 receives an action check access from each of the relay apparatus 4 and the second terminal apparatus 5B, the terminal management apparatus 3 checks whether a client ID corresponding to each of the relay apparatus 4 and the second terminal apparatus 5B from which the access is received is registered in the client-action intermediate table. When it is checked that the client ID is registered, the terminal management apparatus 3 refers to the action table (refer to FIG. 3B) to generate action information, based on the action ID corresponding to the client ID, and returns the action information to the relay apparatus 4 or the second terminal apparatus 5B from which the access is received.

The device-action intermediate table (refer to FIG. 3E) is a table in which, when an action that should be executed in each of the first terminal apparatus 5A and the second terminal apparatus 5B is generated by a command transmitted from the centralized management apparatus 2 to the terminal management apparatus 3 or a command input by a user operation on the terminal management apparatus 3, for example, an action ID indicative of the action is registered in association with a device ID of each of the first terminal apparatus 5A and the second terminal apparatus 5B that should execute the action. When the terminal management apparatus 3 receives an action check access from the relay apparatus 4, the terminal management apparatus 3 refers to the device table (refer to FIG. 3C) to acquire a device ID of the first terminal apparatus 5A existing under the relay apparatus 4 from which the access is received. On the other hand, when the terminal management apparatus 3 receives an action check access from the second terminal apparatus 5B, the terminal management apparatus 3 refers to the device table (refer to FIG. 3C) to acquire a device ID of the second terminal apparatus 5B from which the access is received.

When the device ID of the first terminal apparatus 5A or the second terminal apparatus 5B is acquired, the terminal management apparatus 3 checks whether the acquired device ID is registered in the device-action intermediate table. When it is checked that the device ID is registered, the terminal management apparatus 3 refers to the action table (refer to FIG. 3B) to generate action information, based on the action ID corresponding to the device ID, and returns the action information to the relay apparatus 4 or the second terminal apparatus 5B.

(3) Processing Executed in Terminal Management Apparatus 3

Processing executed in the terminal management apparatus 3 is described. In the terminal management apparatus 3, the CPU 311 executes processing according to the terminal management processing program stored in the memory 312. More specifically, in the terminal management apparatus 3, processing as shown in FIGS. 4A, 4B, 4C and 4D is executed.

(3.1) Information Adding Processing

Figure 4A:
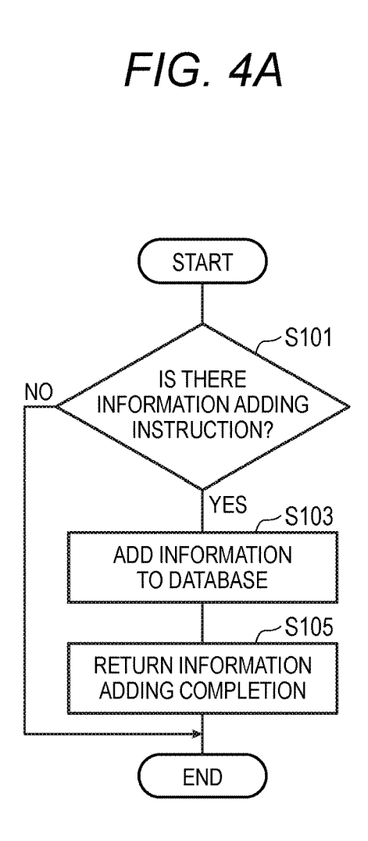
FIG. 4A is a flowchart of information adding processing that is executed in the terminal management apparatus.

When information adding processing shown in FIG. 4A starts, the terminal management apparatus 3 determines whether there is an information adding instruction (S101). When an instruction to the terminal management apparatus 3, the relay apparatus 4 or the terminal apparatus 5 is input to the centralized management apparatus 2 by a user operation on the centralized management apparatus 2, the centralized management apparatus 2 transmits information indicative of a content of the instruction to the terminal management apparatus 3 by an HTTP method "POST". When requesting the terminal management apparatus 3 to add the terminal information, the relay apparatus 4 and the second terminal apparatus 5B transmits the terminal information, which is an adding target, to the terminal management apparatus 3 by the HTTP method "POST".

When the terminal management apparatus 3 receives an access from the centralized management apparatus 2, the relay apparatus 4 or the second terminal apparatus 5B by using the HTTP method "POST", the terminal management apparatus 3 determines in S101 that there is an information adding instruction (S101: YES), and adds information to the tables of the DB 351 (S103). Subsequently, the terminal management apparatus 3 returns an information adding completion to the centralized management apparatus 2, the relay apparatus 4 or the second terminal apparatus 5B that is a transmission source of the information (S105). When the processing of S105 is completed, the information adding processing shown in FIG. 4A is over. When it is determined in S101 that there is no information adding instruction (S101: NO), the terminal management apparatus 3 ends the information adding processing shown in FIG. 4A without executing S103 and S105.

(3.2) Information Acquisition Processing

Figure 4B:
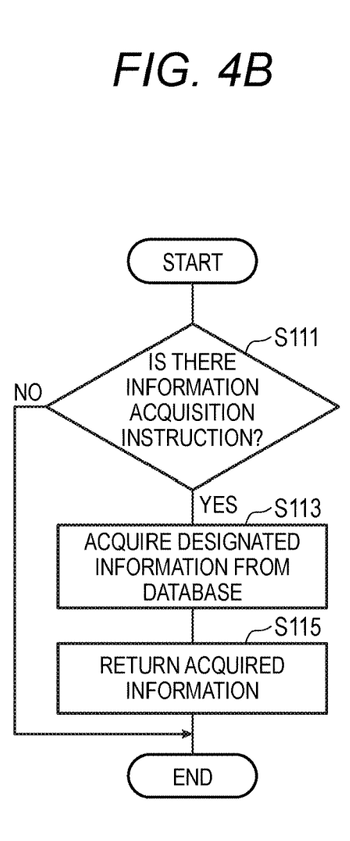
FIG. 4B is a flowchart of information acquisition processing that is executed in the terminal management apparatus.

When information acquisition processing shown in FIG. 4B starts, the terminal management apparatus 3 determines whether there is an information acquisition instruction (S111). When an acquisition instruction of the terminal information from the terminal apparatus 5 is input to the centralized management apparatus 2 by a user operation on the centralized management apparatus 2, the centralized management apparatus 2 transmits information indicative of a content of the instruction to the terminal management apparatus 3 by an HTTP method "GET". When transmitting an acquisition request of the action information to the terminal management apparatus 3, the relay apparatus 4 and the second terminal apparatus 5B transmit the acquisition request to the terminal management apparatus 3 by the HTTP method "GET".

When the terminal management apparatus 3 receives an access from the centralized management apparatus 2, the relay apparatus 4 or the second terminal apparatus 5B by using the HTTP method "GET", the terminal management apparatus 3 determines in S111 that there is an information acquisition instruction (S111: YES), and acquires information designated by the centralized management apparatus 2, the relay apparatus 4 or the second terminal apparatus 5B from the DB 351 (S113). Subsequently, the terminal management apparatus 3 returns the acquired information to the centralized management apparatus 2, the relay apparatus 4 or the second terminal apparatus 5B that is a transmission source of the instruction (S115). When the processing of S115 is completed, the information acquisition processing shown in FIG. 4B is over. When it is determined in S111 that there is no information acquisition instruction (S111: NO), the terminal management apparatus 3 ends the information acquisition processing shown in FIG. 4B without executing S113 and S115.

(3.3) Information Update Processing

Figure 4C:
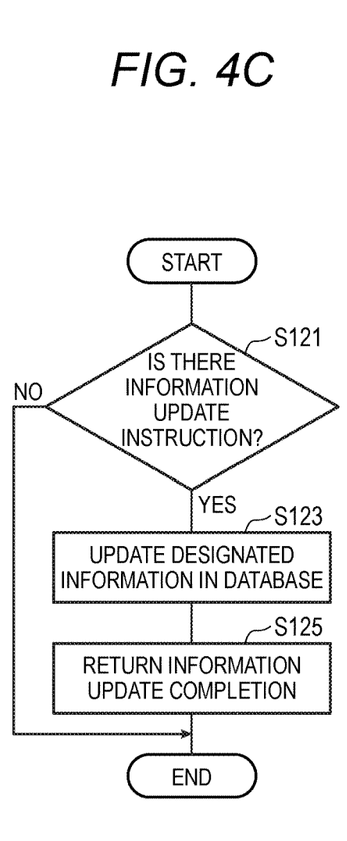
FIG. 4C is a flowchart of information update processing that is executed in the terminal management apparatus.

When information update processing shown in FIG. 4C starts, the terminal management apparatus 3 determines whether there is an information update instruction (S121). When requesting the terminal management apparatus 3 to update the terminal information registered on the DB 351, the relay apparatus 4 and the second terminal apparatus 5B transmit an update request to the terminal management apparatus 3 by an HTTP method "PUT". When the terminal management apparatus 3 receives an access from each of the relay apparatus 4 and the second terminal apparatus 5B by using the HTTP method "PUT", the terminal management apparatus 3 determines in S121 that there is an information update instruction (S121: YES), and updates the designated information in the DB 351 (S123). Subsequently, the terminal management apparatus 3 returns information, which indicates that the information update is completed, to the relay apparatus 4 or the second terminal apparatus 5B that is a transmission source of the instruction (S125). When the processing of S125 is completed, the information update processing shown in FIG. 4C is over. When it is determined in S121 that there is no information update instruction (S121: NO), the terminal management apparatus 3 ends the information update processing shown in FIG. 4C without executing S123 and S125.

(3.4) Information Deletion Processing

Figure 4D:
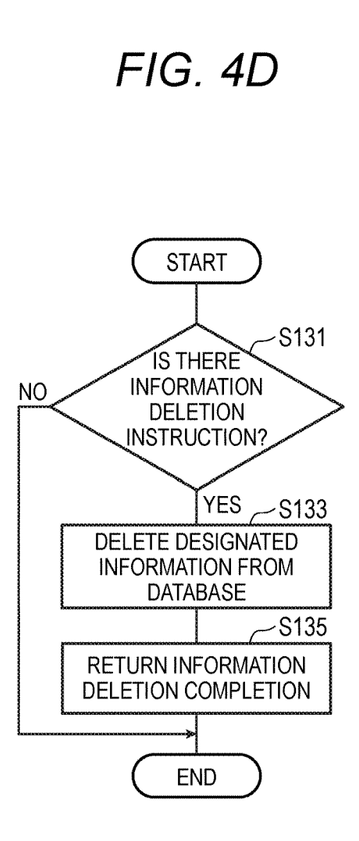
FIG. 4D is a flowchart of information deletion processing that is executed in the terminal management apparatus.

When information deletion processing shown in FIG. 4D starts, the terminal management apparatus 3 determines whether there is an information deletion instruction (S131). When requesting the terminal management apparatus 3 to delete one-off information, the relay apparatus 4 and the second terminal apparatus 5B transmit a deletion request to the terminal management apparatus 3 by an HTTP method "DELETE". When the terminal management apparatus 3 receives an access from the relay apparatus 4 and the second terminal apparatus 5B by using the HTTP method "DELETE", the terminal management apparatus 3 determines in S131 that there is an information deletion instruction (S131: YES), and deletes the designated information from the DB 351 (S133). Subsequently, the terminal management apparatus 3 returns information, which indicates that the information deletion is completed, to the relay apparatus 4 or the second terminal apparatus 5B that is a transmission source of the instruction (S135). When the processing of S135 is completed, the information deletion processing shown in FIG. 4D is over. When it is determined in S131 that there is no information deletion instruction (S131: NO), the terminal management apparatus 3 ends the information deletion processing shown in FIG. 4D without executing S133 and S135.

(3.5) Client Registration Processing

Figure 5:
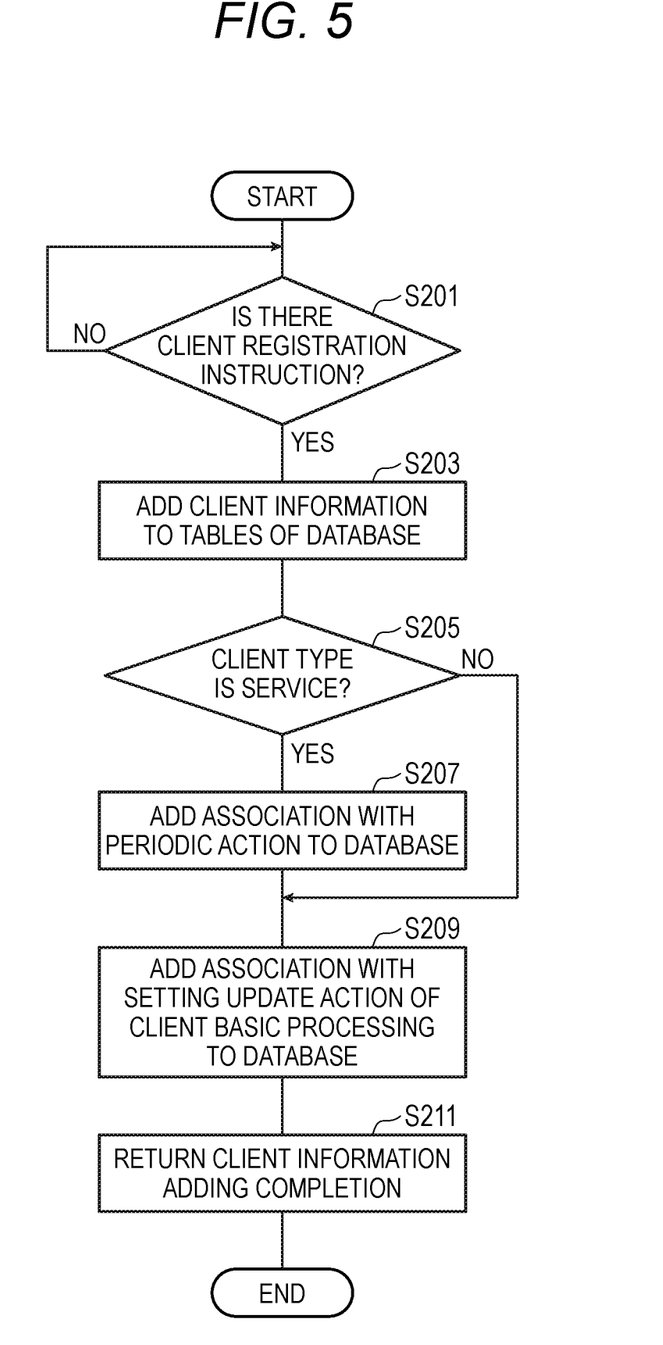
FIG. 5 is a flowchart of client registration processing that is executed in the terminal management apparatus.

Client registration processing is described with reference to FIG. 5. The client registration processing is processing that is executed in the terminal management apparatus 3 when the terminal management apparatus 3 receives an access from the client apparatus (the relay apparatus 4 or the second terminal apparatus 5B). When the client registration processing starts, the terminal management apparatus 3 determines whether there is a client registration instruction (S201). When it is determined in S201 that there is no client registration instruction (S201: NO), the terminal management apparatus 3 returns to S201 and stands by until there is a client registration instruction. On the other hand, when a registration request from the relay apparatus 4 or the second terminal apparatus 5B is received, the terminal management apparatus 3 determines in S201 that there is a client registration instruction.

When it is determined in S201 that there is a client registration instruction (S201: YES), the terminal management apparatus 3 adds information to the tables of the database (the DB 351) (S203). In S203, the client information is added to the client table (refer to FIG. 3A) and the device table (refer to FIG. 3C). Subsequently, the terminal management apparatus 3 determines whether the client type is a service (S205). When a transmission source of the client registration instruction is the relay apparatus 4, it is determined in S205 that the client type is a service.

When it is determined in S205 that the client type is a service (S205: YES), the terminal management apparatus 3 adds association with the periodic action to the database (S207). In S207, the association information of the relay apparatus 4 and the periodic action (for example, the action A shown in FIG. 3B) is additionally registered in the client-action intermediate table (refer to FIG. 3D).

When the processing of S207 is completed, the terminal management apparatus 3 proceeds to S209. Also, when it is determined in S205 that the client type is not a service (S205: NO), the terminal management apparatus 3 proceeds to S209. The case where it is determined in S205 that the client type is not a service is a case where the client apparatus that is a determination target is the second terminal apparatus 5B.

When proceeding from S205 or S207 to S209, the terminal management apparatus 3 performs a setting about basic processing that should be executed by the client apparatus, and adds the association with the update action to the database (S209). In S209, the association information of the relay apparatus 4 or the second terminal apparatus 5B and the update action (for example, the action C shown in FIG.

3B) is additionally registered in the client-action intermediate table (refer to FIG. 3D). Subsequently, the terminal management apparatus 3 returns information, which indicates that the client information adding is completed, to the client apparatus, and ends the client registration processing shown in FIG. 5.

(3.6) Instruction Storing Processing

Figure 6A:
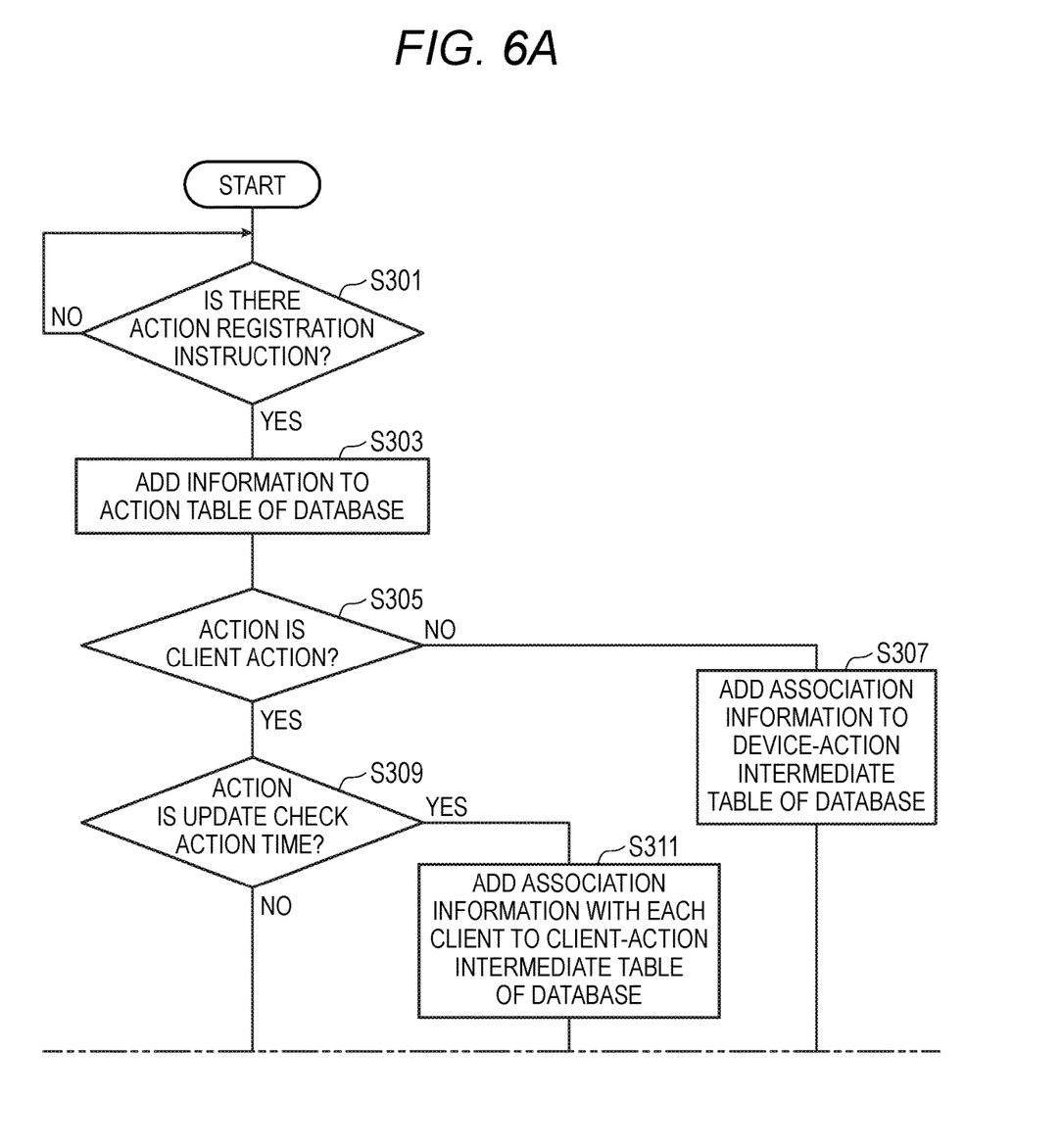
FIGS. 6A and 6B in combination is a flowchart of instruction storing processing that is executed in the terminal management apparatus.
Figure 6B:
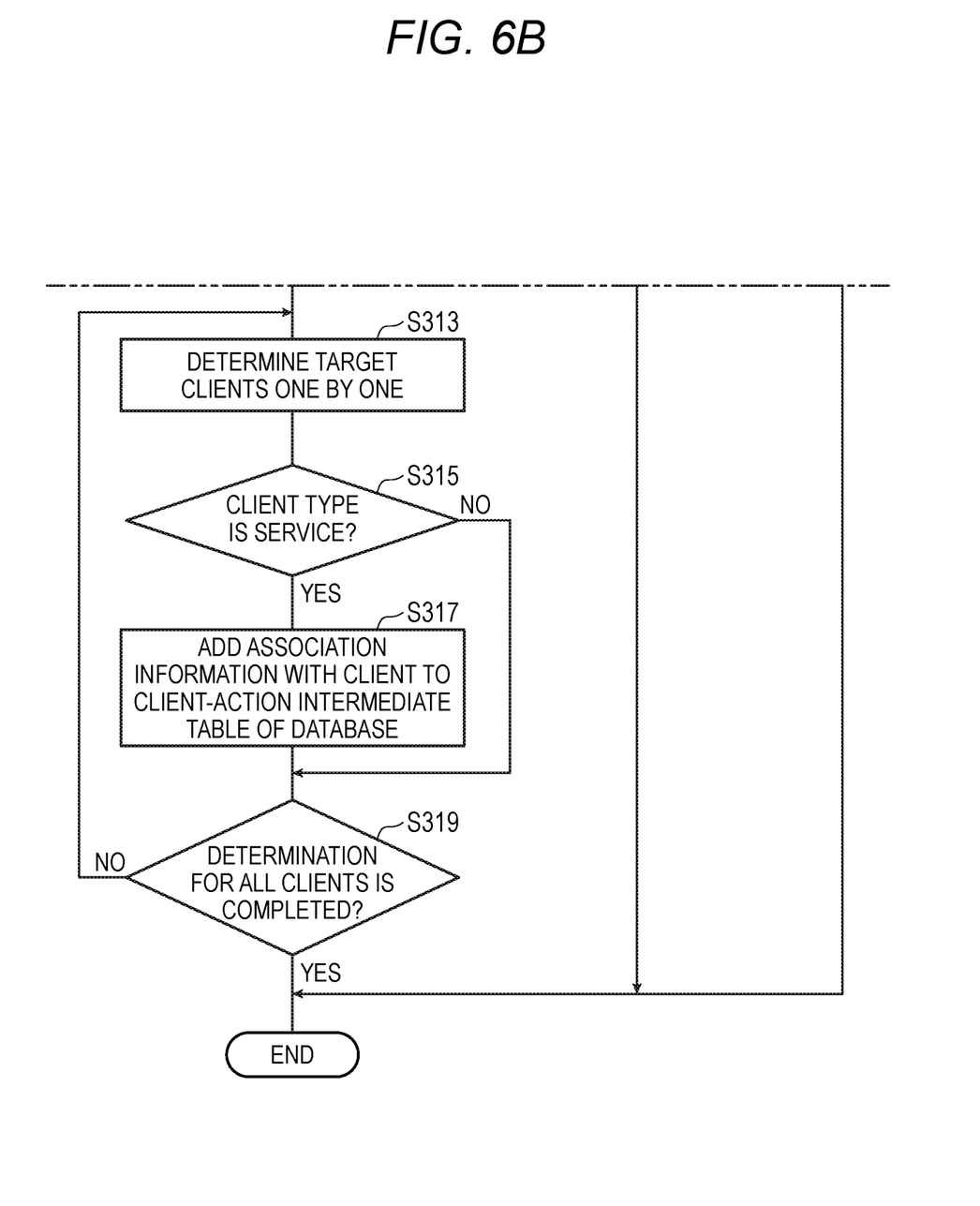

Instruction storing processing is described with reference to FIGS. 6A and 6B. The instruction storing processing is processing that is executed when the terminal management apparatus 3 receives a command transmitted from the centralized management apparatus 2 or a command input to the terminal management apparatus 3. When the instruction storing processing starts, the terminal management apparatus 3 determines whether there is an action registration instruction (S301). When it is determined in S301 that there is no action registration instruction (S301: NO), the terminal management apparatus 3 returns to S301, and stands by until there is an action registration instruction. On the other hand, when it is determined in S301 that there is an action registration instruction (S301: YES), the terminal management apparatus 3 adds information to the action table (refer to FIG. 3B) of the database (S303).

The terminal management apparatus 3 determines whether the action is a client action (S305). In the present embodiment, examples of the client action include "update check action time", "search device", "reset search device", "check status" and "reset check status". Also, examples of the action except the client action include a device action. Examples of the device action include "install file", "apply setting", "reboot", "shutdown", "factory reset" and "test print".

When it is determined in S305 that the action is not a client action (S305: NO), the terminal management apparatus 3 additionally registers the association information in the device-action intermediate table (refer to FIG. 3E) of the database (S307). In S307, the association information of the first terminal apparatus 5A or the second terminal apparatus 5B and the action (for example, the actions B and D shown in FIG. 3B) is additionally registered in the device-action intermediate table (refer to FIG. 3E). When the processing of S307 is completed, the instruction storing processing shown in FIG. 6A is over. On the other hand, when it is determined in S305 that the action is a client action (S305: YES), the terminal management apparatus 3 determines whether the action is an update check action time (S309).

The update check action time (refer to the action C in FIG. 3B) is an action for changing an interval time for the client apparatus to access the terminal management apparatus 3. In the present embodiment, the update check action time is an action that can be executed by both the relay apparatus 4 and the second terminal apparatus 5B. In the meantime, a client action except the update check action time is an action that can be executed by the relay apparatus 4 and is not required to be executed in the second terminal apparatus 5B.

For example, "search device" is an action for the relay apparatus 4 to search for whether the first terminal apparatus 5A newly made to be accessible via the LAN 8 is added. However, the second terminal apparatus 5B does not have to execute the search. "Check status" is an action for the relay apparatus 4 to collect the information about the first terminal apparatus 5A. However, the second terminal apparatus 5B does not have to execute the information collection. Therefore, in S309, based on whether the action is the update check action time, it is sorted whether to include the second terminal apparatus 5B in the transfer target of the action information.

Specifically, when it is determined in S309 that the action is the update check action time (S309: YES), the terminal management apparatus 3 additionally registers the association information with each client (the relay apparatus 4 and the second terminal apparatus 5B) in the client-action intermediate table (refer to FIG. 3D) of the database (S311). In S311, the association information of the relay apparatus 4 or the second terminal apparatus 5B and the update action (for example, the action C shown in FIG. 3D) is additionally registered in the client-action intermediate table (refer to FIG. 3D). When the processing of S311 is completed, the instruction storing processing shown in FIG. 6A is over.

On the other hand, when it is determined in S309 that the action is not the update check action time (S309: NO), the terminal management apparatus 3 determines the target clients one by one (S313). The terminal management apparatus 3 determines whether a client type of a client to be determined in S313 is a service (S315). That is, in S315, it is determined whether a client to be determined in S313 is the relay apparatus 4.

When it is determined in S315 that the client type is a service (S315: YES), the terminal management apparatus 3 additionally registers the association information in the client-action intermediate table of the database (S317). In S317, the association information of the relay apparatus 4 and the periodic action (for example, the action A shown in FIG. 3B) is additionally registered in the client-action intermediate table (refer to FIG. 3D). When the processing of S317 is completed, the terminal management apparatus 3 proceeds to S319. Also, when it is determined in S315 that the client type is not a service (S315: NO), terminal management apparatus 3 proceeds to S319.

When proceeding from S315 or S317 to S319, the terminal management apparatus 3 determines whether the determination for all the clients is completed (S319). When it is determined in S319 that the determination for all the clients is not completed (S319: NO), the terminal management apparatus 3 returns to S313. Thereby, the processing from S313 to S319 is repeatedly executed. While the processing is repeatedly executed, when it is determined that the determination for all the clients is completed (S319: YES), the instruction storing processing shown in FIGS. 6A and 6B is over.

(4) Effects

According to the terminal management system, when it is determined in S309 that an instruction is "update check action time (which is an example of the determination target instruction of the present disclosure), the terminal management apparatus 3 executes processing (S311) for transferring the instruction to the relay apparatus 4 and the second terminal apparatus 5B (which are examples of the primary communication target apparatus of the present disclosure), which are the client apparatuses. On the other hand, when it is determined in S309 that the instruction is not "update check action time", the terminal management apparatus 3 executes processing for transferring the instruction to the relay apparatus 4 (S313-S319).

For this reason, for example, unlike a system where when the terminal management apparatus 3 transfers an instruction received from the centralized management apparatus 2 to the client apparatus, the instruction is uniformly transferred to all the client apparatuses, instructions other than "update check action time" are not transferred to the second terminal apparatus 5B. Therefore, it is not necessary for the second terminal apparatus 5B to treat such some instructions, so that it is possible to accordingly reduce a load on the second terminal apparatus 5B. In addition, for example, in a case where the second terminal apparatus 5B is a battery drive-type mobile terminal apparatus, it is not necessary for the second terminal apparatus 5B to treat some instructions, so that it is possible to accordingly suppress power consumption of the battery in the second terminal apparatus 5B.

(5) Other Embodiments

Although the terminal management processing program, the terminal management apparatus and the terminal management system have been described using the exemplary embodiment, the embodiment is just exemplified as one aspect of the present disclosure. That is, the present disclosure is not limited to the exemplary embodiment and can be implemented in diverse forms without departing from the technical spirit of the present disclosure.

For example, in the above embodiment, the mobile printer and the wireless LAN incompatible type printer or MFP have been exemplified as the terminal apparatus 5. However, the present disclosure is not limited to the configuration where the terminal apparatus 5 has the printer function or not. For example, the terminal apparatus 5 may also be a PC (Personal Computer), a smartphone and the like. Alternatively, the terminal apparatus 5 may also be an industrial device or commercial device (for example, an industrial sewing machine, a vending machine, a commercial washing machine, a medical device and the like) configured to be remotely operated or managed via the network. Alternatively, the terminal apparatus 5 may also be a household electronic product (for example, a refrigerator, a television, an air conditioner, a washing machine and the like) configured to be remotely operated or managed via the network.

In the above embodiment, the LAN 8 is configured by the combination of the wired LAN and the wireless LAN. However, the LAN 8 may also be configured by either the wired LAN or the wireless LAN.

In addition, for example, the plurality of functions that is implemented by one constitutional element exemplified in the embodiment may also be implemented by a plurality of constitutional elements. One function that is implemented by one constitutional element exemplified in the embodiment may also be implemented by a plurality of constitutional elements. The plurality of functions that is implemented by the plurality of constitutional elements exemplified in the embodiment may also be implemented by one constitutional element. One function that is implemented by the plurality of constitutional elements exemplified in the embodiment may also be implemented by one constitutional element. Some of the configurations exemplified in the embodiment may also be omitted.

(6) Supplements

As can be clearly seen from the above-described exemplary embodiment, the terminal management processing program, the terminal management apparatus and the terminal management system of the present disclosure may further have configurations that are enumerated in the below.

(A) In one aspect of the present disclosure, when the terminal management apparatus receives a first access from the primary communication target apparatus, the processing unit may be caused to execute registration processing of registering type information, which indicates whether the primary communication target apparatus having executed the access is the relay apparatus or the second terminal apparatus, on the database provided in the terminal management apparatus. In the second transfer processing, the processing unit may be caused to execute processing of determining whether the primary communication target apparatus, which is set as a processing target, is the relay apparatus, based on the type information registered on the database, and transferring the received instruction to the relay apparatus when it is determined that the primary communication target apparatus is the relay apparatus.

When the processing unit provided for the terminal management apparatus is caused to execute processing based on the terminal management processing program configured in this manner, the type information as described above is registered on the database at the time the terminal management apparatus receives the first access from the primary communication target apparatus. Therefore, when executing the second transfer processing, it is possible to rapidly determine whether the primary communication target apparatus, which is set as a processing target, is the relay apparatus by referring to the type information registered on the database without inquiring whether the primary communication target apparatus is the relay apparatus. Therefore, as compared to a configuration where it is inquired whether the primary communication target apparatus is the relay apparatus, it is possible to reduce a communication load.

(B) In one aspect of the present disclosure, the determination target instruction may be an instruction for causing the primary communication target apparatus to execute processing that can be executed irrespective of whether the primary communication target apparatus is an apparatus capable of communicating with the first terminal apparatus. An instruction except the determination target instruction may be an instruction for causing the primary communication target apparatus to execute processing that can be executed when the primary communication target apparatus is an apparatus capable of communicating with the first terminal apparatus.

When the processing unit provided for the terminal management apparatus is caused to execute processing based on the terminal management processing program configured in this manner, it is possible to suppress an instruction for executing processing that can be executed when the primary communication target apparatus is an apparatus capable of communicating with the first terminal apparatus from being transferred to the second terminal apparatus.

(C) In one aspect of the present disclosure, the instruction that is received from the external apparatus may include an instruction corresponding to processing that should be executed in the primary communication target apparatus and an instruction corresponding to processing that should be executed in the first terminal apparatus and the second terminal apparatus. The instruction corresponding to the processing that should be executed in the primary communication target apparatus may include an instruction corresponding to processing that should be executed in the relay apparatus and the second terminal apparatus, and an instruction corresponding to processing that should be executed in the relay apparatus. The determination target instruction may be an instruction corresponding to the processing that should be executed in the relay apparatus and the second terminal apparatus. In the determination processing, when an instruction is received from the external apparatus, it may be determined whether the received instruction is an instruction corresponding to the processing that should be executed in the primary communication target apparatus or an instruction corresponding to the processing that should be executed in the first terminal apparatus and the second terminal apparatus, and when it is determined that the received instruction is an instruction corresponding to the processing that should be executed in the primary communication target apparatus, it may be determined whether the received instruction is the determination target instruction.

(D) The terminal management apparatus configured to execute processing based on the terminal management processing program and the terminal management system including the terminal management apparatus are also novel and useful. A terminal management method that is executed in the terminal management apparatus on the basis of the terminal management processing program, and a computer-readable non-transitory tangible recording medium having the terminal management processing program stored thereon are also novel and useful.

What is claimed is:

1. A non-transitory computer-readable storage medium storing a computer program, when executed by a computer mounted on a terminal management apparatus in a terminal management system where a first system and a second system coexist, the first system including the terminal management apparatus, a relay apparatus, and a first terminal apparatus, wherein the terminal management apparatus is configured to enable to communicate with the relay apparatus, the relay apparatus is configured to enable to communicate with the first terminal apparatus, and in a case of transferring information between the terminal management apparatus and the first terminal apparatus, the information is transferred via the relay apparatus, and the second system including the terminal management apparatus and a second terminal apparatus, wherein the terminal management apparatus is configured to enable to communicate with the second terminal apparatus, and in a case of transferring information between the terminal management apparatus and the second terminal apparatus, the information is transferred without passing through the relay apparatus, the computer program being configured to cause the terminal management apparatus to:

in a case where the terminal management apparatus receives an instruction to a primary communication target apparatus, which is configured to enable to communicate with the terminal management apparatus, from an external apparatus, determine whether the received instruction is a determination target instruction;

transfer the received instruction to the primary communication target apparatus in a case where it is determined that the received instruction is the determination target instruction; and transfer the received instruction to the relay apparatus in a case where it is determined that the received instruction is not the determination target instruction.

2. The non-transitory computer-readable storage medium according to claim 1, wherein the computer program being configured to cause the terminal management apparatus to:

in a case where the terminal management apparatus receives a first access from the primary communication target apparatus, register type information in a database provided in the terminal management apparatus, the type information indicating whether the primary communication target apparatus executing the access is the relay apparatus or the second terminal apparatus; and in the case of transferring the received instruction to the relay apparatus, determine whether the primary communication target apparatus is the relay apparatus based on the type information registered on the database, and transfer the received instruction to the relay apparatus in a case where it is determined that the primary communication target apparatus is the relay apparatus.

3. The non-transitory computer-readable storage medium according to claim 1, wherein the determination target instruction is an instruction for causing the primary communication target apparatus to execute processing that is possible to be executed irrespective of whether the primary communication target apparatus is an apparatus that enables to communicate with the first terminal apparatus, and an instruction except the determination target instruction is an instruction for causing the primary communication target apparatus to execute processing that is possible to be executed in a case where the primary communication target apparatus is an apparatus that enables to communicate with the first terminal apparatus.

4. The non-transitory computer-readable storage medium according to claim 1, wherein the instruction received from the external apparatus includes an instruction corresponding to processing that should be executed in the primary communication target apparatus and an instruction corresponding to processing that should be executed in the first terminal apparatus and the second terminal apparatus, the instruction corresponding to the processing that should be executed in the primary communication target apparatus includes an instruction corresponding to processing that should be executed in the relay apparatus and the second terminal apparatus and an instruction corresponding to processing that should be executed in the relay apparatus, the determination target instruction is an instruction corresponding to processing that should be executed in the relay apparatus and the second terminal apparatus, and in the case of determining whether the received instruction is the determination target instruction, the computer program being configured to cause the terminal management apparatus to:

determine whether the received instruction is the instruction corresponding to the processing that should be executed in the primary communication target apparatus or the instruction corresponding to the processing that should be executed in the first terminal apparatus and the second terminal apparatus, and determine whether the received instruction is the determination target instruction in a case where it is determined that the received instruction is the instruction corresponding to the processing that should be executed in the primary communication target apparatus.

5. A terminal management apparatus in a terminal management system where a first system and a second system coexist, the first system including the terminal management apparatus, a relay apparatus, and a first terminal apparatus, wherein the terminal management apparatus is configured to enable to communicate with the relay apparatus, the relay apparatus is configured to enable to communicate with the first terminal apparatus, and in a case of transferring information between the terminal management apparatus and the first terminal apparatus, the information is transferred via the relay apparatus, and the second system including the terminal management apparatus and a second terminal apparatus, wherein the terminal management apparatus is configured to enable to communicate with the second terminal apparatus, and in a case of transferring information between the terminal management apparatus and the second terminal apparatus, the information is transferred without passing through the relay apparatus, the terminal management apparatus is configured to:

in a case where the terminal management apparatus receives an instruction to a primary communication target apparatus, which is configured to enable to communicate with the terminal management apparatus, from an external apparatus, determine whether the received instruction is a determination target instruction;

transfer the received instruction to the primary communication target apparatus in a case where it is determined that the received instruction is the determination target instruction; and transfer the received instruction to the relay apparatus in a case where it is determined that the received instruction is not the determination target instruction.

6. A terminal management system where a first system and a second system coexist, the first system including a terminal management apparatus, a relay apparatus, and a first terminal apparatus, wherein the terminal management apparatus is configured to enable to communicate with the relay apparatus, the relay apparatus is configured to enable to communicate with the first terminal apparatus, and in a case of transferring information between the terminal management apparatus and the first terminal apparatus, the information is transferred via the relay apparatus, and the second system including the terminal management apparatus and a second terminal apparatus, wherein the terminal management apparatus is configured to enable to communicate with the second terminal apparatus, and in a case of transferring information between the terminal management apparatus and the second terminal apparatus, the information is transferred without passing through the relay apparatus, the terminal management apparatus is configured to:

in a case where the terminal management apparatus receives an instruction to a primary communication target apparatus, which is configured to enable to communicate with the terminal management apparatus, from an external apparatus, determine whether the received instruction is a determination target instruction;

transfer the received instruction to the primary communication target apparatus in a case where it is determined that the received instruction is the determination target instruction; and transfer the received instruction to the relay apparatus in a case where it is determined that the received instruction is not the determination target instruction.

* * * * *